(12) United States Patent
Kang et al.

(10) Patent No.: US 8,493,904 B2
(45) Date of Patent: Jul. 23, 2013

(54) METHOD AND APPARATUS FOR SUPPORTING SHORT MESSAGING SERVICE OF MOBILE STATION DURING IDLE MODE IN WIRELESS COMMUNICATION SYSTEM

(75) Inventors: Hyun-Jeong Kang, Seoul (KR);
Dong-Keon Kong, Suwon-si (KR);
Ji-Cheol Lee, Suwon-si (KR);
Jong-Hyun Won, Seongnam-si (KR);
Kyeong-Tae Do, Suwon-si (KR);
Sung-Jin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 383 days.

(21) Appl. No.: 12/883,530

(22) Filed: Sep. 16, 2010

(65) Prior Publication Data

US 2011/0069681 A1 Mar. 24, 2011

(30) Foreign Application Priority Data

Sep. 22, 2009 (KR) .................. 10-2009-0089414
Oct. 30, 2009 (KR) .................. 10-2009-0104173

(51) Int. Cl.
*H04W 4/00* (2009.01)
(52) U.S. Cl.
USPC ............ 370/313; 370/328; 370/341; 370/431
(58) Field of Classification Search
None
See application file for complete search history.

(56) References Cited

U.S. PATENT DOCUMENTS

| 2006/0203712 A1 | 9/2006 | Lim et al. |
| 2007/0293244 A1 | 12/2007 | Lee et al. |
| 2008/0031128 A1 | 2/2008 | Jang et al. |
| 2008/0165671 A1* | 7/2008 | Larsson ........................ 370/204 |
| 2010/0067467 A1* | 3/2010 | Cho et al. ..................... 370/329 |
| 2010/0069097 A1* | 3/2010 | Chin et al. .................... 455/466 |
| 2010/0142486 A1* | 6/2010 | Wahlqvist et al. ............ 370/332 |
| 2011/0069681 A1* | 3/2011 | Kang et al. .................... 370/335 |

FOREIGN PATENT DOCUMENTS

| KR | 10-2006-0040541 A | 5/2006 |
| KR | 10-2007-0094228 A | 9/2007 |

OTHER PUBLICATIONS

Zhang et al., Short Data Burst Support for MSS in Sleep Mode, IEEE C802.16e-04, Aug. 30, 2004.
Zhang et al., Support of Short Data Burst Transmission to/from an MSS in Sleep Mode of Idle Mode, IEEE C802.16e-04/538, Nov. 4, 2004.
Lee et al., Proposed Text on L2 Short Messaging Service for AWD (AWD-15.2.6), IEEE C802.16m-0911585, Jul. 6, 2009.
Kang et al., SMS Confirmation (16.2.24), IEEE C802.16m-09/2840, Dec. 31, 2009.

* cited by examiner

*Primary Examiner* — Andrew Chriss
*Assistant Examiner* — Salvador E Rivas
(74) *Attorney, Agent, or Firm* — Jefferson IP Law, LLP

(57) ABSTRACT

A method and apparatus for supporting a Short Message Service (SMS) of a Mobile Station (MS) during an idle mode in a wireless communication system are provided. An MS operation method for supporting an SMS in a wireless communication system includes receiving an SMS message from a Base Station (BS) through a ranging message in an idle mode, upon receiving the SMS message from the BS, starting a timer, while the timer operates, waiting UpLink (UL) resource allocation for transmission of an ACKnowledge (ACK) message about the SMS message, and, upon being allocated a UL resource for the ACK message transmission, transmitting the ACK message using the UL resource.

33 Claims, 12 Drawing Sheets

METHOD AND APPARATUS FOR SUPPORTING SHORT MESSAGING SERVICE OF MOBILE STATION DURING IDLE MODE IN WIRELESS COMMUNICATION SYSTEM

PRIORITY

This application claims the benefit under 35 U.S.C. §119(a) of a Korean patent application filed in the Korean Intellectual Property Office on Sep. 22, 2009 and assigned Serial No. 10-2009-0089414 and a Korean patent application filed in the Korean Intellectual Property Office on Oct. 30, 2009 and assigned Serial No. 10-2009-0104173, the entire disclosures of each which are hereby incorporated by reference.

BACKGROUND OF THE INVENTION

1. Field of the Invention

The present invention relates to a wireless communication system. More particularly, the present invention relates to a method and apparatus for transmitting a Short Message Service (SMS) message in a wireless communication system supporting an idle mode Mobile Station (MS).

2. Description of the Related Art

In the 4$^{th}$ Generation (4G) communication system, which is the next generation communication system, research and commercialization are being conducted to provide users with various services having a data rate of about 100 Mbps or more. In particular, research on the 4 G communication system is now being conducted to support high-speed services in the way of guaranteeing mobility and Quality-of-Service (QoS) for a Broadband Wireless Access (BWA) communication system such as wireless Local Area Network (LAN) system and wireless Metropolitan Area Network (MAN) system. One example of a 4 G communication system is an Institute of Electrical and Electronics Engineers (IEEE) 802.16 communication system.

According to the IEEE 802.16 communication system standard, in a case where traffic to be transmitted/received does not exist during a predefined time, a Mobile Station (MS) operates in an idle mode and minimizes power consumption. The MS wakes up from the idle mode during a paging listening interval and receives a paging message. The paging message includes information instructing the idle mode MS to perform a network reentry operation such that the idle mode MS transitions from the idle mode to a connection mode (i.e., a connected state) because there exists DownLink (DL) data to be forwarded to the idle mode MS, instructing the idle mode MS to perform location update, or the like. The DL data includes SMS information to be transmitted to the idle mode MS. In a case where an SMS message of the idle mode MS is on standby, a Base Station (BS) has to instruct the idle mode MS to perform the network reentry operation using the paging message.

On the other hand, the IEEE 802.16m communication system provides a method in which, in a case where there is a need to transmit an SMS message to an idle mode MS, the idle mode MS can receive the SMS message without a transition process from the idle mode to a connection mode (i.e., a connected state). A process of supporting SMS message transmission to the idle mode MS defined in the IEEE 802.16m communication system is described below with reference to FIG. 1.

FIG. 1 is a ladder diagram illustrating SMS message transmission from a BS to an idle mode MS in a wireless communication system according to the related art.

Referring to FIG. 1, while the MS 100 performs a paging non-listening interval operation of an idle mode in step 101, the BS 150 receives an SMS message for the MS 100 in step 103. In step 105, the MS 100 performs a paging listening interval operation. In step 107, the BS 150 transmits a paging message including information for the MS 100, to the MS 100. The paging message of step 107 includes information instructing the MS 100 to perform a location update process. Upon receiving the paging message including the information instructing the MS 100 to perform the location update process from the BS 150 in step 107, the MS 100 proceeds to step 109 and transmits a ranging code to the BS 150. In response to the ranging code transmitted in step 109, in step 111, the MS 100 receives a ranging code response message from the BS 150. In step 113, the MS 100 transmits a ranging request message, including an indicator informing that the MS 100 is performing a location update process, to the BS 150. After receiving the ranging request message of step 113 from the MS 100, in step 114, the BS 150 transmits a ranging response message including SMS information.

The transmission of the SMS message to the idle mode MS in the IEEE 802.16m communication system described above with reference to FIG. 1 utilizes the ranging message that is used in the ranging process. However, the combining of the ranging process with the SMS message adds complexity to the processing by the idle mode MS and thus, there is a need for a way of transmitting the SMS message to the idle mode MS irrespective of the ranging process.

SUMMARY OF THE INVENTION

An aspect of the present invention is to address at least the above-mentioned problems and/or disadvantages and to provide at least the advantages described below. Accordingly, an aspect of the present invention is to provide a Short Message Service (SMS) message transmission processing way of a Mobile Station (MS) that is in an idle mode.

The above aspects are addressed by providing a method and apparatus for supporting an SMS of an MS during an idle mode in a wireless communication system.

In accordance with an aspect of the present invention, an MS operation method for supporting an SMS in a wireless communication system is provided. The method includes receiving an SMS message from a Base Station (BS) through a ranging message in an idle mode, upon receiving the SMS message from the BS, starting a timer, while the timer operates, waiting UpLink (UL) resource allocation for transmission of an ACKnowledge (ACK) message about the SMS message, and, upon being allocated a UL resource for the ACK message transmission, transmitting the ACK message using the UL resource.

In accordance with another aspect of the present invention, a BS operation method for supporting an SMS in a wireless communication system is provided. The method includes transmitting an SMS message through a ranging message, after transmitting the SMS message, starting a timer, while the timer operates, allocating a UL resource for transmission of an ACK message about the SMS message, and receiving the ACK message about the SMS message.

In accordance with a further aspect of the present invention, an MS apparatus for supporting an SMS in a wireless communication system is provided. The apparatus includes a receiver, a controller, and a transmitter. The receiver receives an SMS message from a BS through a ranging message in an idle mode. Upon receiving the SMS message from the BS, the controller starts a timer and, while the timer operates, waiting UL resource allocation for transmission of an ACK message about the SMS message. Upon being allocated a UL resource for the ACK message transmission, the transmitter transmits the ACK message using the UL resource.

In accordance with a yet another aspect of the present invention, a BS apparatus for supporting an SMS in a wireless communication system is provided. The apparatus includes a transmitter, a controller, and a receiver. The transmitter transmits an SMS message through a ranging message in an idle mode. After transmitting the SMS message, the controller starts a timer and, while the timer operates, allocates a UL resource for transmission of an ACK message about the SMS message. The receiver receives the ACK message about the SMS message.

In accordance with a still another aspect of the present invention, an MS operation method for processing an SMS in a wireless communication system is provided. The method includes, upon generation of an SMS message to be transmitted in an idle mode, starting a timer, and receiving UL resource allocation used for the SMS message transmission, transmitting an SMS message using the allocated UL resource, and receiving an ACK message about the SMS message.

In accordance with a still another aspect of the present invention, a BS operation method for processing an SMS in a wireless communication system is provided. The method includes performing UL resource allocation used for SMS message transmission, and starting a timer, while the timer operates, identifying one of reception and non-reception of an SMS message, upon receiving the SMS message and transmitting an ACK message about the SMS message.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments the present invention will be more apparent from the following description when taken in conjunction with the accompanying drawings in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An exemplary method and apparatus for supporting Short Message Service (SMS) message transmission to an idle mode Mobile Station (MS) and SMS message transmission from an idle mode MS in a wireless communication system (e.g., an Institute of Electrical and Electronics Engineers (IEEE) 802.16m system) according to the present invention are described below.

Figure 1:
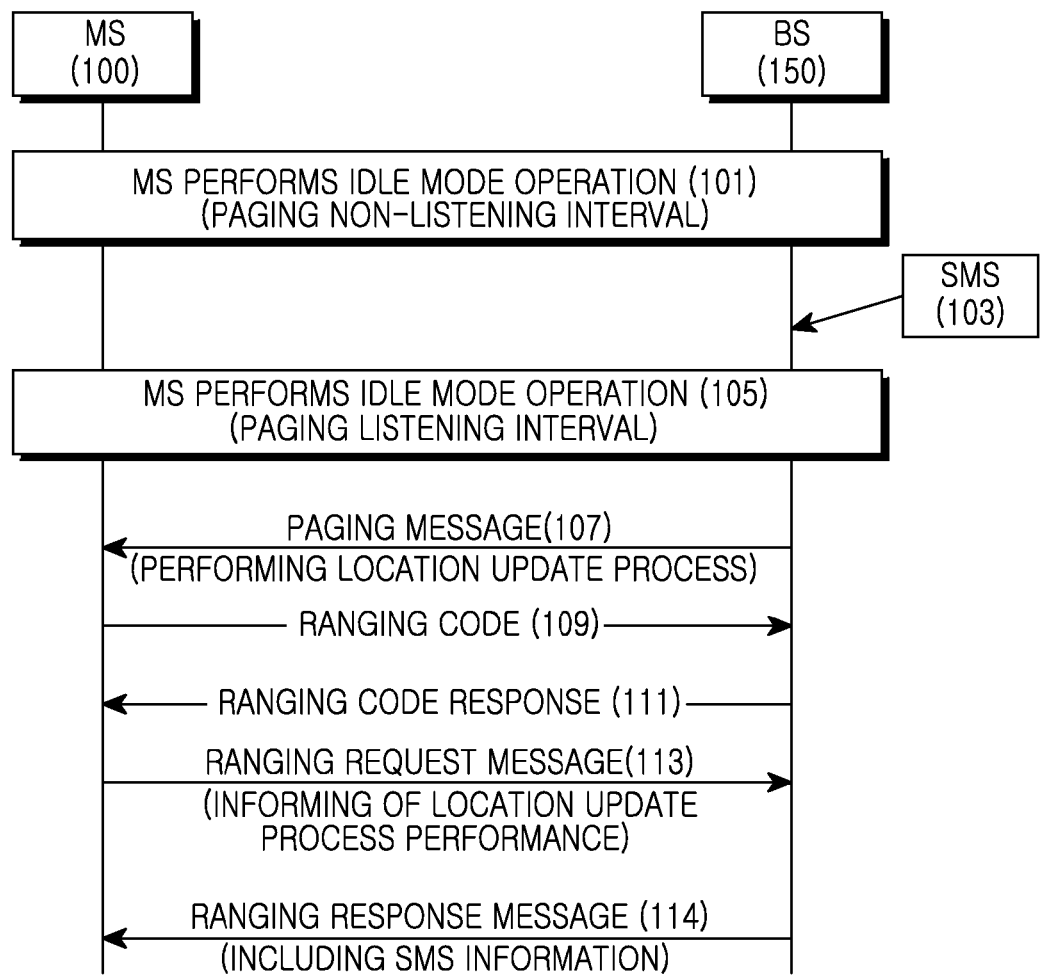
FIG. 1 is a ladder diagram illustrating Short Message Service (SMS) message transmission from a Base Station (BS) to an idle mode Mobile Station (MS) in a wireless communication system according to the related art.
Figure 2:
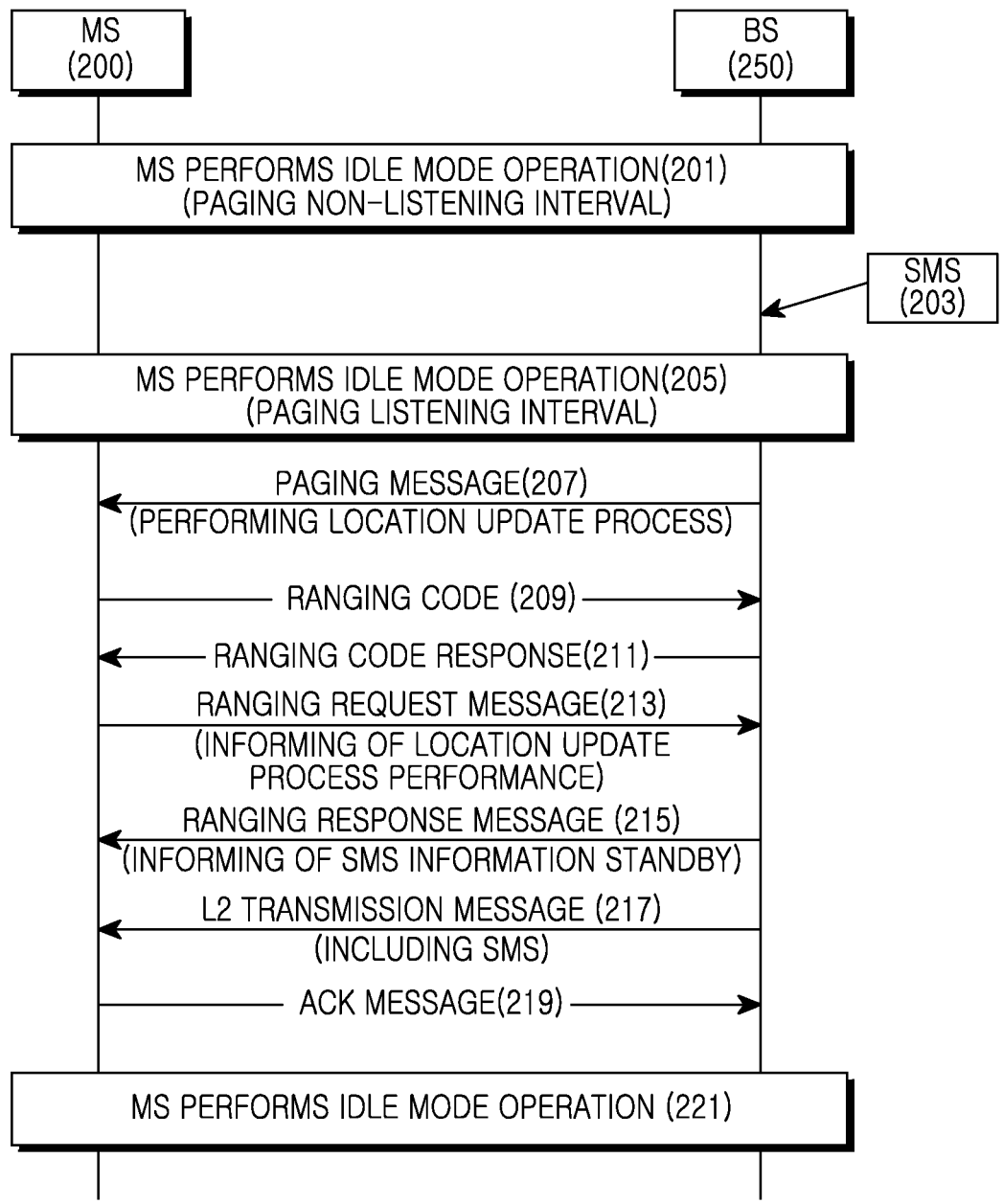
FIG. 2 is a ladder diagram illustrating a signal flow between a BS and an idle mode MS in a case where the BS transmits an SMS message to the idle mode MS in a wireless communication system according to an exemplary embodiment of the present invention.

FIG. 2 is a ladder diagram illustrating a signal flow between a Base Station (BS) and an idle mode MS in a case where the BS transmits an SMS message to the idle mode MS in a wireless communication system according to an exemplary embodiment of the present invention.

Referring to FIG. 2, while the MS 200 performs a paging non-listening interval operation of an idle mode in step 201, the MS 200 transitions to a paging listening interval of the idle mode in step 205. On the other hand, in step 203, the BS 250 recognizes the generation of an SMS message to be transmitted to the idle mode MS 200. In step 207, the BS 250 transmits a paging message including information on the MS 200 performing a paging listening interval operation, to the MS 200. The paging message includes information instructing the MS 200 to perform a location update process. Here, instructing the MS 200 to perform the location update process corresponds to information instructing the MS 200 to perform a general location update process. However, in the case of making a separate definition of information instructing the MS 200 to perform a location update process for SMS message reception, the defined instruction information may be included in the paging message of step 207.

In step 209, the MS 200 transmits a ranging code to the BS 250 and, in step 211, the MS 200 receives a ranging code response message from the BS 250. In step 213, the MS 200 transmits a ranging request message including an indicator informing location update process performance, to the BS 250. On the other hand, in a case where the MS 200 is previously aware of SMS transmission information through the paging message of step 207, the ranging request message transmitted in step 213 may include an indicator informing that the MS 200 is performing a location update process for SMS communication.

The indicator informing that the MS 200 is performing the location update process for SMS communication, included in the ranging request message, can use one bit of a ranging purpose indicator that is a field of the ranging request message.

TABLE 1

| Ranging purpose indicator | The presence of this item in the message indicates the following Advanced Mobile Station (AMS) action: If Bit#0 is set to 1, in combination with a serving BS IDentifier (BSID), it indicates that the AMS is currently attempting unprepared HandOver (HO). If Bit#1 is set to 1, in combination with a paging controller IDentifier (ID), it indicates that the AMS is attempting network reentry from idle mode to the ABS. If Bit#2 is set to 1, it indicates that the AMS is currently attempting prepared HO. If Bit#3 is set to 1, it indicates that the AMS is initiating the idle mode location update process. Bit#4: ranging request for emergency call setup. When this bit is set to 1, it indicates AMS action of Emergency Call process. Bit#5 is set to 1, it indicates that the AMS is initiating the idle mode location update process for SMS message service. |
|---|---|

As shown in Table 1 above, if the Bit#0 of the 'Ranging purpose indicator' is set to '1', in combination with the serving BSID, it indicates that the MS is currently attempting HO. If the Bit#1 is set to '1', in combination with the paging controller ID, it indicates that the MS is attempting network reentry to the BS in the idle mode. If the Bit#2 is set to '1', it indicates that the MS is currently attempting prepared HO. If the Bit#3 is set to '1', it indicates that the MS is performing the idle mode location update process. And, if the Bit#4 is set to '1', it indicates the MS is performing the emergency call process. Lastly, if the Bit#5 is set to '1', it indicates that the MS is initiating the idle mode location update process for SMS message service.

In step 215, the MS 200 receives a ranging response message as a response to the ranging request message, from the BS 250. The ranging response message includes an indicator informing the MS 200 of the result of the location update process for SMS communication. The indicator informing of the result of the location update process for SMS communication is a response to the performance of the location update process by the MS 200, and informs that there is an SMS message to be received by the MS 200.

The indicator informing of the result of the location update process for SMS communication, included in the ranging response message, can utilize one bit of a location update response that is a field of the ranging response message.

TABLE 2

| Location update response | 0 × 00 = Success of Location Update<br>0 × 01 = Failure of Location Update<br>0 × 02 = Reserved<br>0 × 03 = Success of location update and DownLink (DL) traffic pending<br>0 × 04: Success of location update for SMS message service |
|---|---|

Also, the ranging response message includes a STation IDentifier (STID) that the MS 200 will use for SMS message reception.

After that, in step 217, the MS 200 receives a Layer 2 (L2) transmission message including the SMS information from the BS 250. The L2 transmission message is encoded using the STID information received in step 215. A header of the L2 transmission message includes a Flow IDentifier (FID) corresponding to a primary connection. After receiving the L2 transmission message including the SMS information, in step 219, the MS 200 transmits an ACKnowledge (ACK) message to the BS 250. After that, in step 221, the MS 200 performs an idle mode operation. After the BS 250 receives the ACK message from the MS 200, the BS 250 releases the STID allocated to the MS 200 and the primary connection and manages the MS 200 as an idle mode MS.

Figure 3:
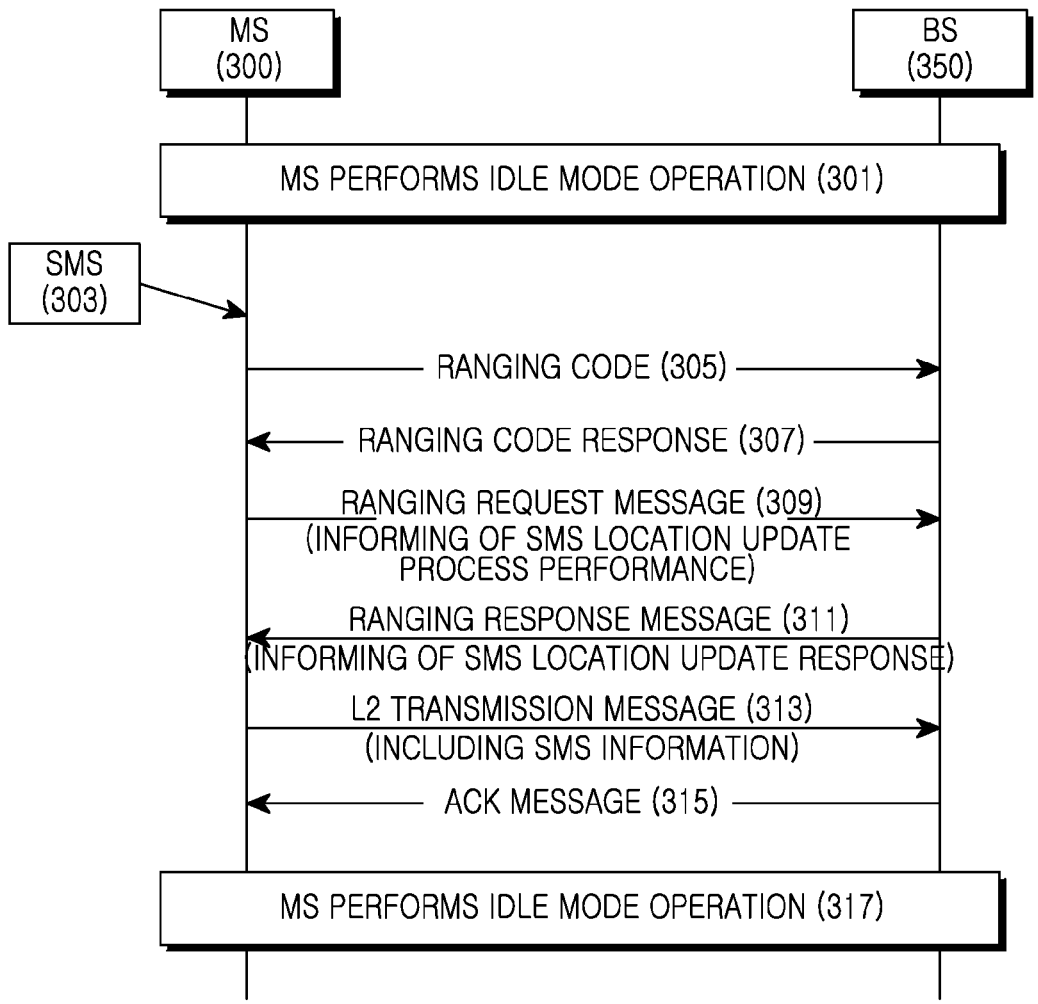
FIG. 3 is a ladder diagram illustrating a signal flow between a BS and an idle mode MS in a case where the idle mode MS transmits an SMS message to the BS in a wireless communication system according to an exemplary embodiment of the present invention.

FIG. 3 is a ladder diagram illustrating a signal flow between a BS and an idle mode MS in a case where the idle mode MS transmits an SMS message to the BS in a wireless communication system according to an exemplary embodiment of the present invention.

Referring to FIG. 3, while the MS 300 performs an idle mode operation in step 301, the MS 300 recognizes that an SMS message to be UpLink (UL) transmitted exists in a buffer in step 303. In step 305, the MS 300 transmits a ranging code for connection to the BS 350 in order to transmit the SMS message to the BS 350. In response to the transmitted ranging code, in step 307, the MS 300 receives a ranging code response message from the BS 350. In step 309, the MS 300 transmits a ranging request message to the BS 350. The ranging request message includes an indicator informing that the MS 300 is performing a location update process for SMS message transmission. Examples of the indicator included in the ranging request message are shown in Table 1 above. Upon receiving the ranging request message including the indicator informing that the MS 300 is performing the location update process for SMS message transmission, in step 311, the BS 350 transmits a ranging response message to the MS 300. The ranging response message transmitted in step 311 includes an indicator informing the result of the location update process for SMS message transmission. Examples of the indicator included in the ranging response message are shown in Table 2 above. The indicator informing the result of the location update process is a response to the indicator informing that the MS 300 is performing the location update process, and informs that the BS 350 is prepared for receiving the SMS message to be transmitted by the MS 300.

Also, through the ranging response message, the BS 350 transmits an STID (i.e., an MS identifier) that the MS 300 will use for transmitting the SMS message, to the MS 300. In step 313, the MS 300 transmits an L2 transmission message including SMS information to the BS 350. When transmitting the L2 transmission message, the MS 300 uses the STID received in step 311 and an FID corresponding to a primary connection. Also, the MS 300 should be allocated a UL band from the BS 350 in order to transmit the L2 transmission message and, at this time, the MS 300 uses the STID and the FID corresponding to the primary connection. After receiving the L2 transmission message including the SMS information from the MS 300, in step 315, the BS 350 transmits an ACK message to the MS 300. After the MS 300 receives the ACK message, the MS 300 proceeds to step 317 and performs an idle mode operation. In step 317, the BS 350 releases the STID allocated for the SMS message transmission of the MS 300 and the FID corresponding to the primary connection and then, the BS 350 manages the MS 300 as an idle mode MS.

Figure 4:
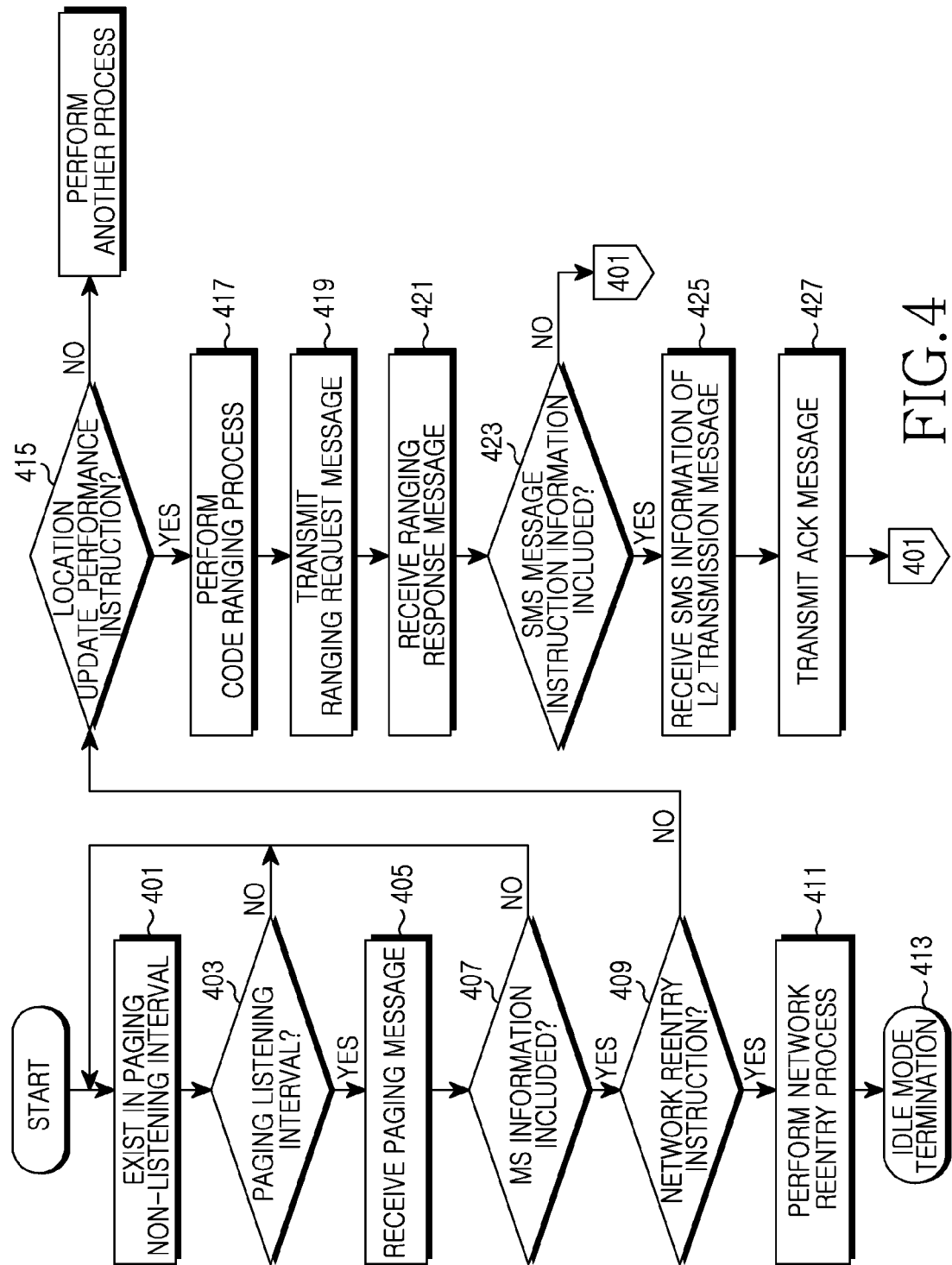
FIG. 4 is a flow diagram illustrating an operation of an MS receiving an SMS message in an idle mode in a wireless communication system according to an exemplary embodiment of the present invention.

FIG. 4 is a flow diagram illustrating an operation of an MS receiving an SMS message in an idle mode in a wireless communication system according to an exemplary embodiment of the present invention.

Referring to FIG. 4, in step 401, the MS exists in a paging non-listening interval of an idle mode. In step 403, the MS determines if it is a time point to transition to a paging listening interval. If transitioning to the paging listen interval, the MS proceeds to step 405 and receives a paging message in the paging listening interval. If the result of the determination in step 403 is that it is not the time point to transition to the paging listening interval, the MS maintains the paging non-listening interval of step 401.

In step 407, the MS determines if the paging message includes corresponding information. If the paging message does not include the corresponding information, the MS returns to step 401. If the result of the determination in step 407 is that the paging message includes information on the MS, the MS proceeds to step 409 and determines if the MS information is a network reentry instruction. If receiving the network reentry instruction in step 409, in step 411, the MS performs a network reentry process and, in step 413, the MS exits the idle mode. The network reentry process of step 411 starts as the MS performs a ranging process with a BS. The network reentry process is outside the scope of the present disclosure and thus, its detailed description is omitted.

In contrast, if the MS information is not the network reentry instruction, in step 415, the MS determines if the MS information includes an instruction to perform a location update process. If the MS information includes an instruction to perform the location update process in step 415, in step 417, the MS performs a code-based ranging process to the BS. The ranging process corresponds to steps 209 to 211 of FIG. 2. In step 419, the MS transmits a ranging request message to the BS. The ranging request message includes information informing that the MS is performing a location update process. Examples of information included in the ranging request message are shown in Table 1 above. In step 421, the MS receives a ranging response message from the BS. In step 423, the MS determines if the ranging response message includes SMS message instruction information. The SMS message instruction information of step 423 includes the result of the location update and is an instruction for SMS message transmission. Examples of the SMS message instruction information are shown in Table 2 above.

If the result of the determination in step 423 is that the ranging response message includes an SMS message instruction, the ranging response message of step 421 includes STID information used for the MS to receive the SMS message. Also, the MS recognizes that a primary connection is set to receive the SMS message and an FID corresponding to the primary connection is usable.

In step 425, the MS receives an L2 transmission message including SMS information. The L2 transmission message can be decoded using the STID and the FID corresponding to the primary connection. In step 427, the MS transmits an ACK message to the BS, and returns to step 401.

If the result of the determination in step 423 is that the SMS message instruction information is not included, the MS returns to step 401.

If the result of the determination in step 415 is that the MS information does not include an instruction to perform the location update process of the MS, the MS performs other defined processes, e.g., returns to step 401.

Figure 5:
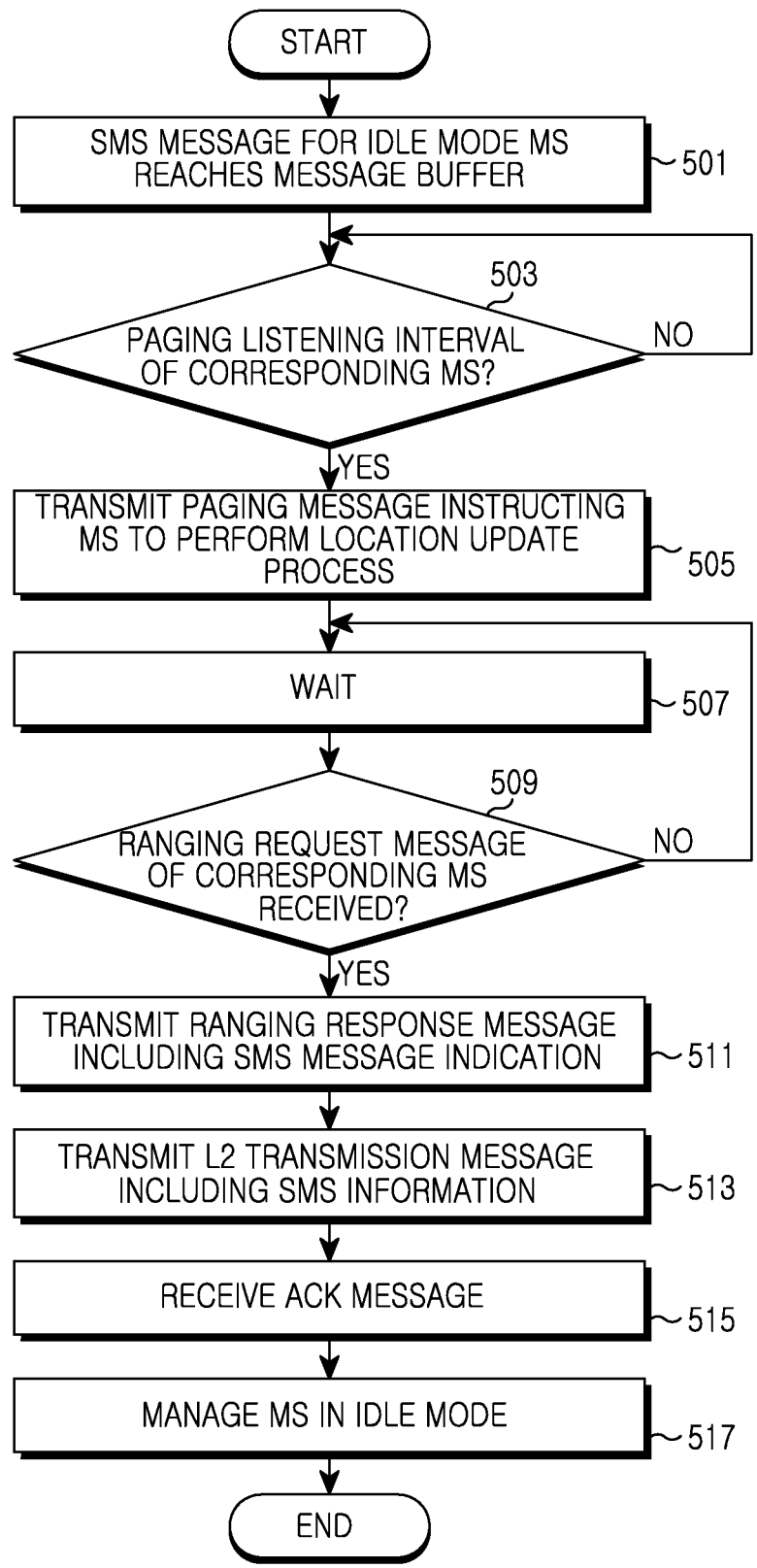
FIG. 5 is a flow diagram illustrating an operation of a BS transmitting an SMS message to an idle mode MS in a wireless communication system according to an exemplary embodiment of the present invention.

FIG. 5 is a flow diagram illustrating an operation of a BS transmitting an SMS message to an idle mode MS in a wireless communication system according to an exemplary embodiment of the present invention.

Referring to FIG. 5, in step 501, the BS recognizes that an SMS message for an idle mode MS reaches a message buffer. In step 503, the BS waits up to a time point corresponding to a paging listening interval of the MS. In step 505, the BS transmits a paging message instructing the MS to perform a location update process in the paging listening interval of the MS.

In step 507, the BS waits for a location update process message (i.e., a ranging request message) of the MS and, in step 509, the BS determines if it receives the ranging request message including information indicating that the MS is performing a location update process, from the MS. Examples of the ranging request message received from the MS in step 509 are shown in Table 1 above. In step 511, the BS transmits a ranging response message as a response to the ranging request message. The ranging response message includes an indicator (i.e., the information shown in Table 2 above) indicating SMS message transmission to the MS, and STID information of the MS.

In step 513, the BS transmits an L2 transmission message including SMS information to the MS. In step 515, the BS receives an ACK message from the MS and, in step 517, the BS recognizes that the MS proceeds to an idle mode.

Figure 6:
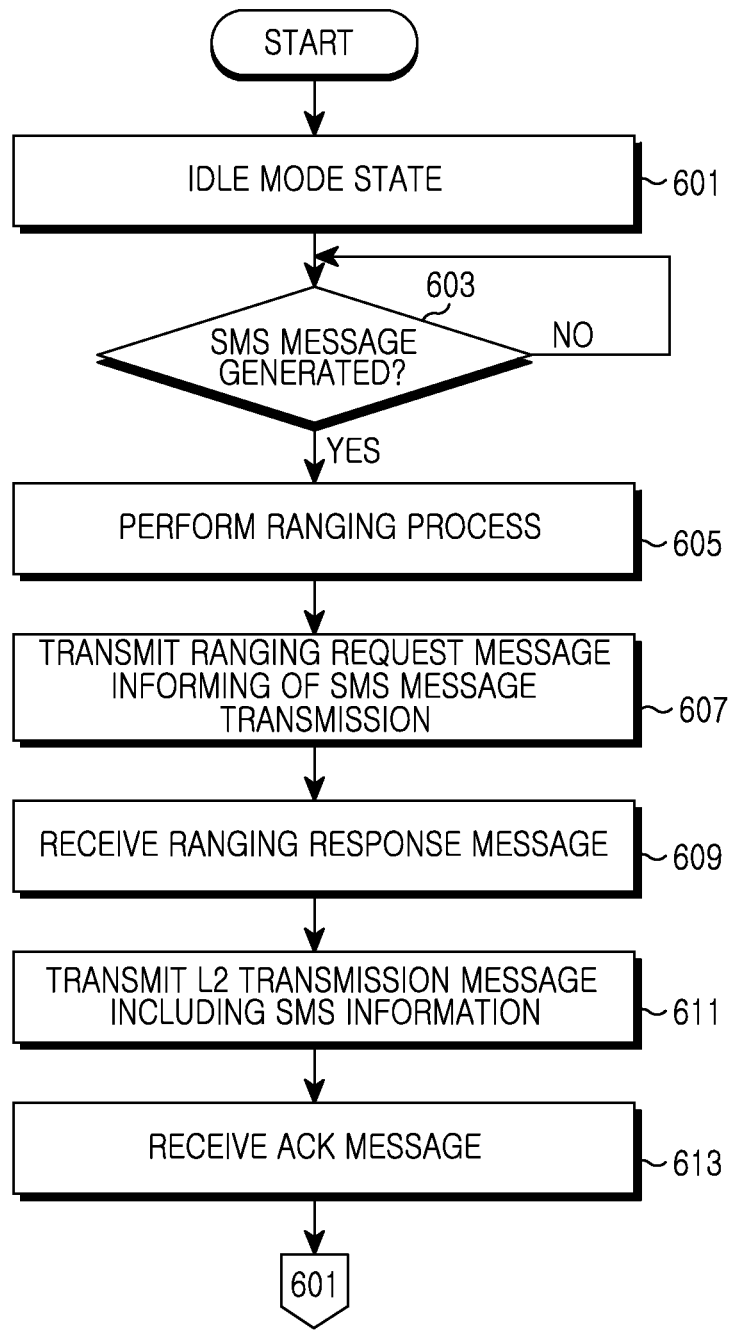
FIG. 6 is a flow diagram illustrating an operation of an MS transmitting an SMS message in an idle mode in a wireless communication system according to an exemplary embodiment of the present invention.

FIG. 6 is a flow diagram illustrating an operation of an MS transmitting an SMS message in an idle mode in a wireless communication system according to an exemplary embodiment of the present invention.

Referring to FIG. 6, while the MS is in an idle mode state in step 601, in step 603, the MS determines if an SMS message is generated and is in a buffer (i.e., if there is an SMS message input by a user). If the SMS message to be transmitted by the MS exists in step 603, the MS proceeds to step 605 and performs a code-based ranging process to perform a location update process for transmitting the SMS message. Step 605 corresponds to steps 305 to 307 of FIG. 3. In step 607, the MS transmits a ranging request message including indication information informing that the MS is performing a location update process for SMS message transmission.

Examples of the indication information informing that the MS is performing the location update process for SMS message transmission are shown in Table 1 above. In step 609, the MS receives a ranging response message from a BS. The ranging response message includes indication information informing the result of the location update process for SMS message transmission. Examples of the indication information informing the result of the location update process for SMS message transmission are shown in Table 2 above, and includes STID information that the MS will use for the SMS message transmission. In step 611, the MS transmits an L2 transmission message including SMS information. At this time, the MS uses the STID included in the ranging response message of step 609 and primary connection FID information for a UL band request/allocation process for transmitting the L2 transmission message. In step 613, the MS receives an ACK message from the BS, and returns to step 601.

Figure 7:
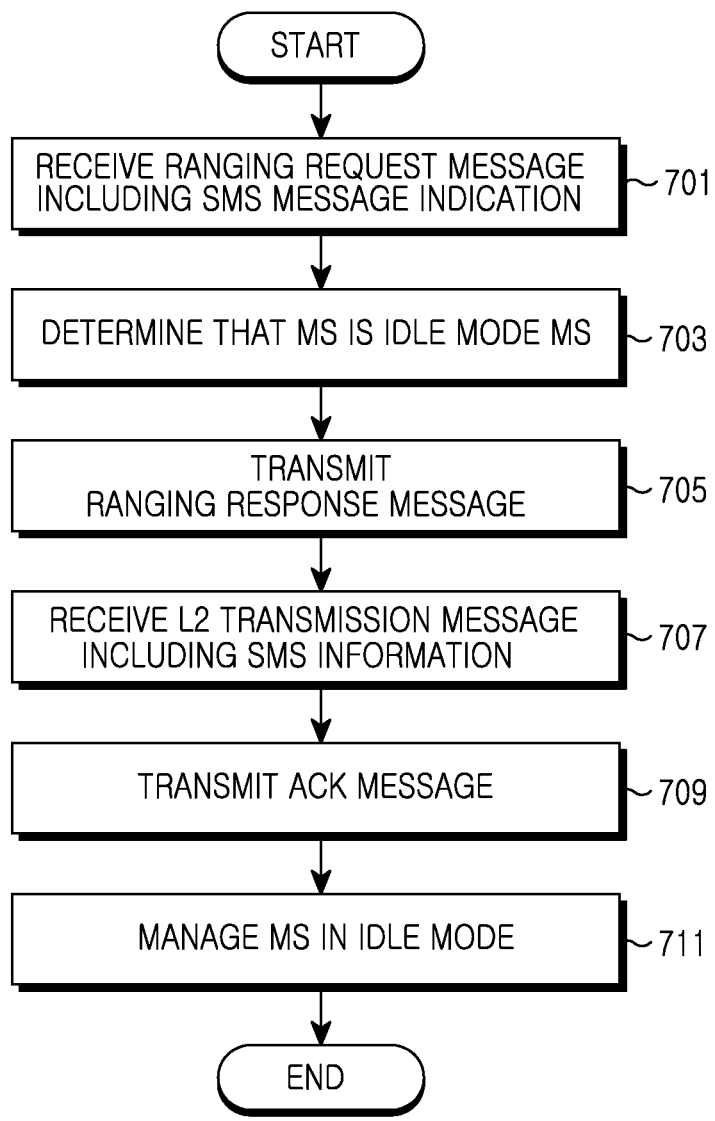
FIG. 7 is a flow diagram illustrating an operation of a BS receiving an SMS message from an idle mode MS in a wireless communication system according to an exemplary embodiment of the present invention.

FIG. 7 is a flow diagram illustrating an operation of a BS receiving an SMS message from an idle mode MS in a wireless communication system according to an exemplary embodiment of the present invention.

Referring to FIG. 7, in step 701, the BS receives a ranging request message indicating that the MS is performing a location update process for SMS message transmission. Examples of the ranging request message are shown in Table 1 above. In step 703, the BS recognizes that an MS transmitting the ranging request message is an idle mode MS. In step 705, the BS transmits a ranging response message including a location update process performance indicator for the SMS message transmission, to the MS. Examples of the indicator information are shown in Table 2 above. The BS transmits STID information that the MS will use for the SMS message transmission, using the ranging response message. Also, the BS sets a primary connection that the MS will use for transmitting SMS information. In step 707, the BS receives an L2 transmission message including the SMS information from the MS. Before step 707, the BS can perform a UL band request/allocation process for the L2 transmission message transmitted by the MS.

In step 709, the BS transmits an ACK message to the MS and, in step 711, the BS recognizes that the MS again performs an idle mode operation. In step 711, the BS releases the STID allocated to the MS in step 705 and the primary connection.

In the procedures of FIGS. 3, 6, and 7, a description is made assuming the UL band request and allocation process for transmitting the L2 transmission message including the SMS information between the MS and the BS are performed. On the other hand, the BS can be previously aware that the MS transmits the L2 transmission message including the SMS information through the ranging request message transmitted by the MS. At this time, without the separate UL band request and allocation process, band allocation information to transmit the L2 transmission message may be transmitted together through the ranging response message.

On the other hand, in a case where an SMS message and general DL data to be forwarded to an idle mode MS exist in a BS, the BS transmits a paging message instructing a network reentry during a paging listening interval of the idle mode MS. After that, if the network reentry process with the MS is completed, the BS forwards the SMS message and general DL data to the MS. In contrast, in a case where there exist an SMS message and general UL data to be transmitted by the idle mode MS, the MS performs a network reentry process to the BS and then, transmits the SMS message and general UL data to the BS. The above-described operation is identical with a general transition operation from an idle mode to a connected state, and corresponds to the network reentry process implemented upon state transition.

Figure 8:
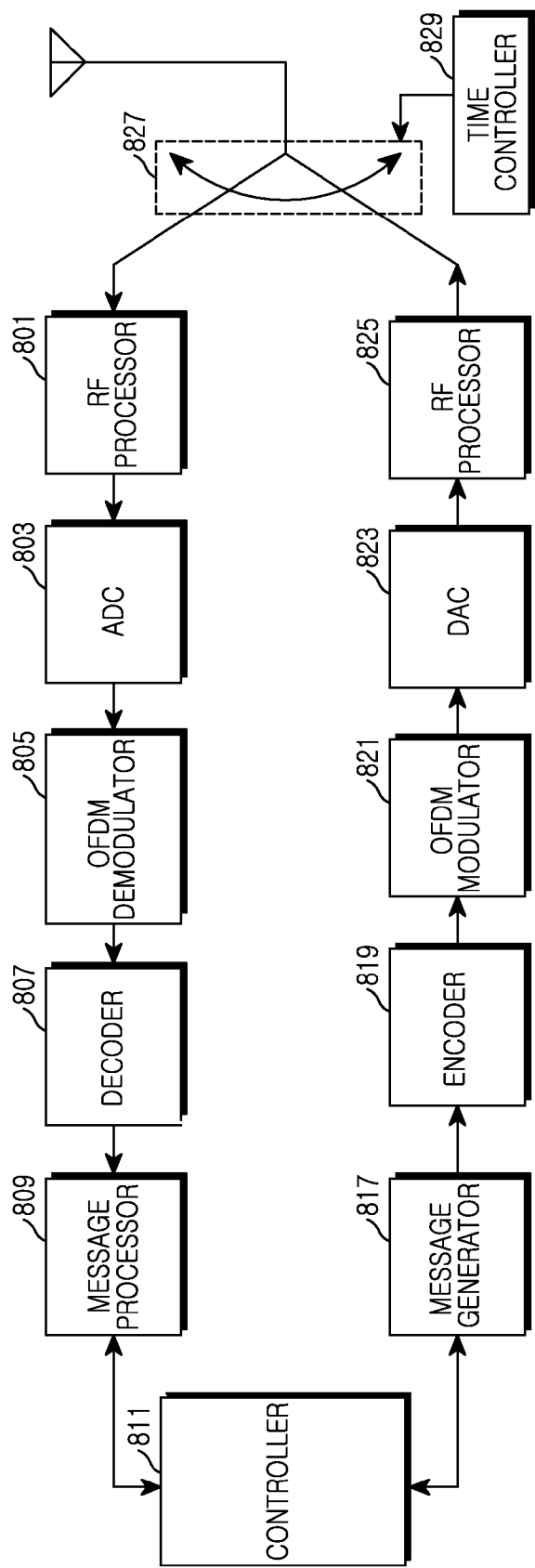
FIG. 8 is a block diagram illustrating a construction of an apparatus for transmitting/receiving an SMS message to/from an idle mode MS in a wireless communication system according to an exemplary embodiment of the present invention.

FIG. 8 is a block diagram illustrates a construction of an apparatus for transmitting/receiving an SMS message to/from an idle mode MS in a wireless communication system according to an exemplary embodiment of the present invention. The apparatus can be a BS or an MS.

Referring to FIG. 8, the apparatus includes a Radio Frequency (RF) processor 801, an Analog to Digital Converter (ADC) 803, an Orthogonal Frequency Division Multiplexing (OFDM) demodulator 805, a decoder 807, a message processor 809, a controller 811, a message generator 817, an encoder 819, an OFDM modulator 821, a Digital to Analog Converter (DAC) 823, and an RF processor 825. Here, the RF processor 801 and the RF processor 825 can operate in a Time Division Duplex (TDD) or Frequency Division Duplex (FDD) mode. For instance, in the operation of the TDD mode, during a reception interval, a time controller 829 controls a switch 827 to operate the RF processor 801 and, during a transmission interval, controls the switch 827 to operate the RF processor 825.

The RF processor 801 converts an RF signal received through an antenna into a baseband analog signal. The ADC 803 converts the analog signal from the RF processor 801 into sample data. The OFDM demodulator 805 processes, by a Fast Fourier Transform (FFT), the sample data outputted from the ADC 803 to convert the sample data into frequency domain data, and selects data of subcarriers intended for actual reception among the frequency domain data. The decoder 807 demodulates and decodes the data from the OFDM demodulator 805 according to a predefined modulation level (i.e., a Modulation and Coding Scheme (MCS) level). The message processor 809 analyzes a control message inputted from the decoder 807 and provides the result to the controller 811. For example, the message processor 809 analyzes a ranging request message, a ranging response message, a paging message, and the like and provides the result to the controller 811.

The controller 811 performs a corresponding process for information from the message processor 809 and also, generates and provides information to be transmitted, to the message generator 817. The message generator 817 generates a message with a variety of kinds of information provided from the controller 811 and outputs the message to the encoder 819 of a physical layer. For example, the message generator 817 generates a ranging request message, a ranging response message, a paging message, and the like and outputs the generated message to the encoder 819 of a physical layer.

The encoder 819 encodes and modulates data from the message generator 817 according to a predefined modulation level (i.e., an MCS level). The OFDM modulator 821 processes, by an Inverse Fast Fourier Transform (IFFT), the data from the encoder 819 and outputs sample data (i.e., an OFDM symbol). The DAC 823 converts the sample data into an analog signal. The RF processor 825 converts the analog signal from the DAC 823 into an RF signal and transmits the RF signal through the antenna.

In the aforementioned construction, the controller 811, a protocol controller, controls the message processor 809 and the message generator 817. That is, the controller 811 can perform a function of the message processor 809 and the message generator 817. These are separately constructed and shown in order to distinguish and describe respective functions in the exemplary embodiments of the present invention. Thus, in an actual realization, construction can be such that all of the respective functions are processed in the controller 811, or construction can be such that only part of the respective functions are processed in the controller 811. Also, the controller 811 receives information used during performance of the protocol processing using a corresponding constituent part of the physical layer, or generates a control signal using a corresponding constituent part of the physical layer.

An operation of a case where a BS transmits an SMS message to an MS is described below. While a controller 811 of the MS 200 performs a paging non-listening interval operation of an idle mode, the controller 811 of the MS 200 transitions to a paging listening interval of the idle mode.

A controller 811 of the BS 250 recognizes the generation of an SMS to be transmitted to the idle mode MS 200, and transmits a paging message including information on the MS 200 performing a paging listening interval operation. The paging message includes information instructing the MS 200 to perform a location update process.

The controller 811 of the MS 200 transmits a ranging code to the BS 250, and receives a ranging code response message from the BS 250. The controller 811 of the MS 200 transmits a ranging request message including an indicator informing that the MS 200 is performing location update process, to the BS 250. The indicator included in the ranging request message can use one bit of a ranging purpose indicator that is a field of the ranging request message.

The controller 811 of the MS 200 receives a ranging response message as a response to the ranging request message from the BS 250. The ranging response message includes an indicator informing the MS 200 of a result of the location update process for SMS communication. The indicator informing of the result of the location update process for SMS communication is a response to the location update process performed by the MS 200, and informs that there is an SMS message to be received by the MS 200.

The controller 811 of the MS 200 receives an L2 transmission message including the SMS information from the BS 250. The L2 transmission message is encoded using the STID information received in step 215. A header of the L2 transmission message includes an FID corresponding to a primary connection. After receiving the L2 transmission message including the SMS information, the controller 811 of the MS 200 transmits an ACK message to the BS 250. After transmitting the ACK message, the controller 811 of the MS 200 performs an idle mode operation. The controller 811 of the BS 250 receives the ACK message from the MS 200 and then, releases the STID allocated to the MS 200 and the primary connection and manages the MS 200 as an idle mode MS.

In contrast, an operation of a case where an MS transmits an SMS message to a BS is described below. While performing an idle mode operation, a controller 811 of the MS 300 recognizes that an SMS message to be UL transmitted exists in a buffer. In order to transmit the SMS message, the controller 811 of the MS 300 transmits a ranging code for access to the BS 350. In response to the transmitted ranging code, the controller 811 of the MS 300 receives a ranging code response message from the BS 350. The controller 811 of the MS 300 transmits a ranging request message to the BS 350. The ranging request message includes an indicator informing that the MS is performing a location update process for SMS message transmission. Examples of the indicator included in the ranging request message are shown in Table 1 above.

The controller 811 of the BS 350 transmits a ranging response message to the MS 300. The ranging response message includes an indicator informing of the result of the location update process for SMS message transmission. Examples of the indicator informing of the result of the location update process are shown in Table 2 above. The indicator informing of the result of the location update process is sent a response to the indicator informing that the MS is performing the location update process, and informs that the BS 350 is prepared to receive the SMS message to be transmitted by the MS 300.

Also, through the ranging response message, the controller 811 of the BS 350 transmits an STID (i.e., an MS identifier) that the controller 811 of the MS 300 will use for transmitting the SMS message. The controller 811 of the MS 300 transmits an L2 transmission message including SMS information to the BS 350. When transmitting the L2 transmission message, the controller 811 of the MS 300 uses a received STID and an FID corresponding to a primary connection. Also, in order to transmit the L2 transmission message, the controller 811 of the MS 300 should be allocated a UL band from the BS 350 and, at this time, the controller 811 of the MS 300 uses the STID and the FID corresponding to the primary connection. After receiving the L2 transmission message including the SMS information from the MS 300, the controller 811 of the BS 350 transmits an ACK message to the MS 300. The controller 811 of the MS 300 receives the ACK message and then, performs an idle mode operation.

In an example of FIG. 2, a description is made for a case where, when an SMS message is transmitted using an L2 transmission message, a BS allocates an STID and an FID to an MS in order to receive the SMS message and transmit an ACK message about the received SMS message. The STID and FID are allocated in a connection state between the BS and the MS. In other words, in the example of FIG. 2, the use of the L2 transmission message needs a bandwidth request operation based on an MS identifier (i.e., the STID).

In another exemplary embodiment of FIGS. 9 to 12 below, a BS does not allocate an STID and an FID to an idle mode MS, and may include an SMS message in the ranging response message of step 215 so as to transmit the SMS message of an L2 layer. In this case, there is a need for a way in which the MS transmits a reception response to the SMS message included in the ranging response message. For the sake of this, in a connectionless state between the BS and the MS, a separate reception response resource for an SMS message is used. In other words, the BS allocates UL resources for ACK message transmission in unsolicited manner.

Figure 9:
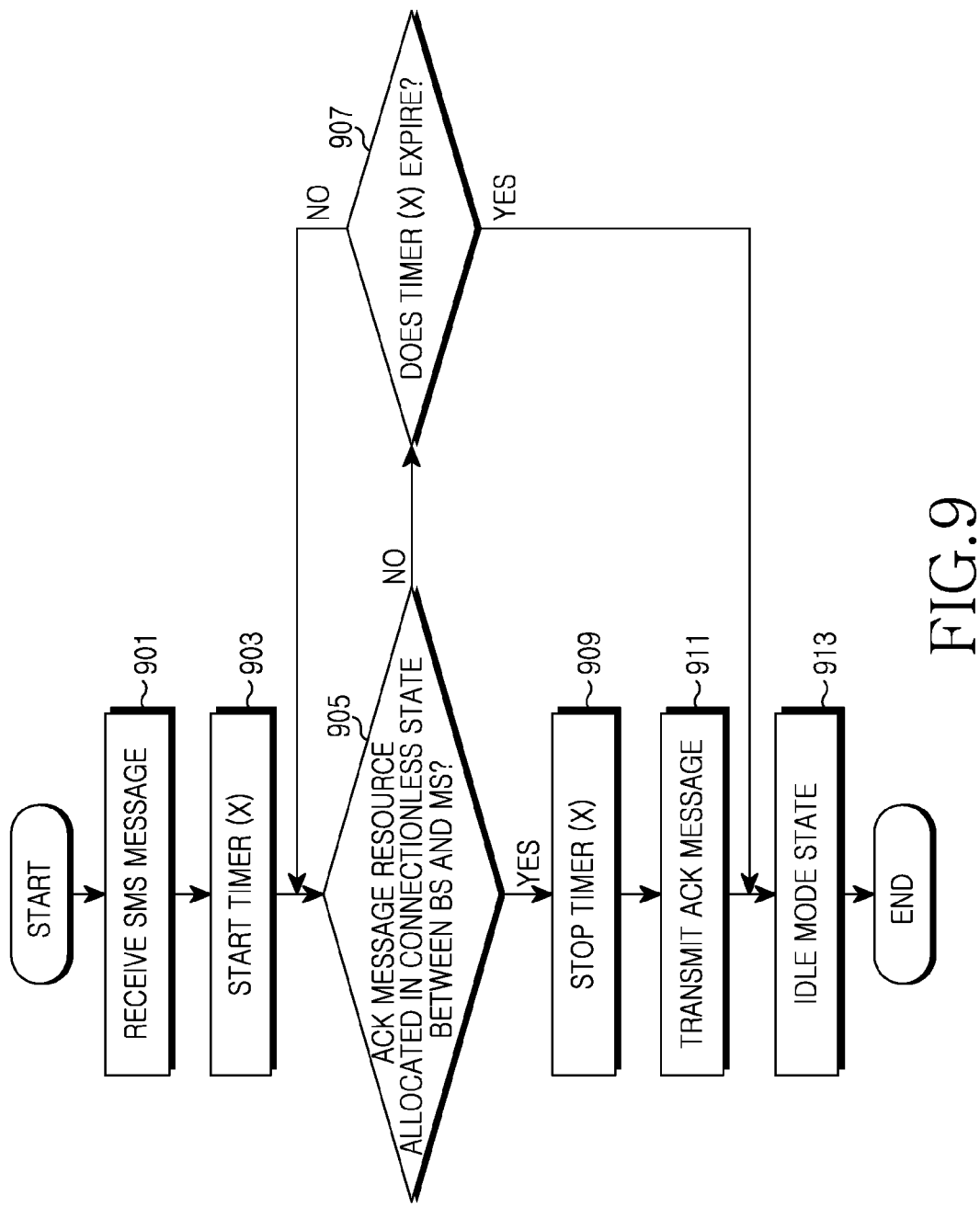
FIG. 9 is a flow diagram illustrating an operation of an MS processing a reception response to an SMS message in a wireless communication system according to an exemplary embodiment of the present invention.

FIG. 9 is a flow diagram illustrating an operation of an MS processing a reception response to an SMS message in a wireless communication system according to an exemplary embodiment of the present invention.

Referring to FIG. 9, if the MS receives a ranging response message including an SMS message in step 901, in step 903, the MS starts a timer (X). The ranging response message including the SMS message of step 901 corresponds to the ranging response message of step 215. While the timer (X) starts, in step 905, the MS waits if a UL resource to transmit an ACK message about the SMS message is allocated by a BS in a connectionless state between the MS and the BS.

The ranging response message of step 901 includes an identifier used for decoding a UL resource capable of determining if the UL resource is allocated to the MS. Alternatively, the identifier may be configured based on an MS identifier that the MS uses in an idle mode, and can be used to identify the MS in combination with information such as a paging period of the MS and the like. If the result of the determination in step 905 is that the MS is allocated the UL resource for ACK message transmission, in step 909, the MS stops the timer (X). In step 911, the MS transmits the ACK message to the BS. The ACK message may be identical with the ACK message of step 219. At this time, an FID included in a Media Access Control (MAC) header of the ACK message is received from the BS through the ranging response message of step 901, or corresponds to an FID predefined for the purpose of an SMS message reception response. After transmitting the ACK message, the MS proceeds to an idle mode of step 913. If the MS is not allocated the UL resource to transmit the ACK message in step 905 and the timer (X) expires in step 907, the MS proceeds to the idle mode of step 913. In contrast, if the MS is not allocated the UL resource to transmit the ACK message in step 905 and the timer (X) does not expire in step 907, the MS returns to step 905 and waits for ACK message resource allocation.

Figure 10:
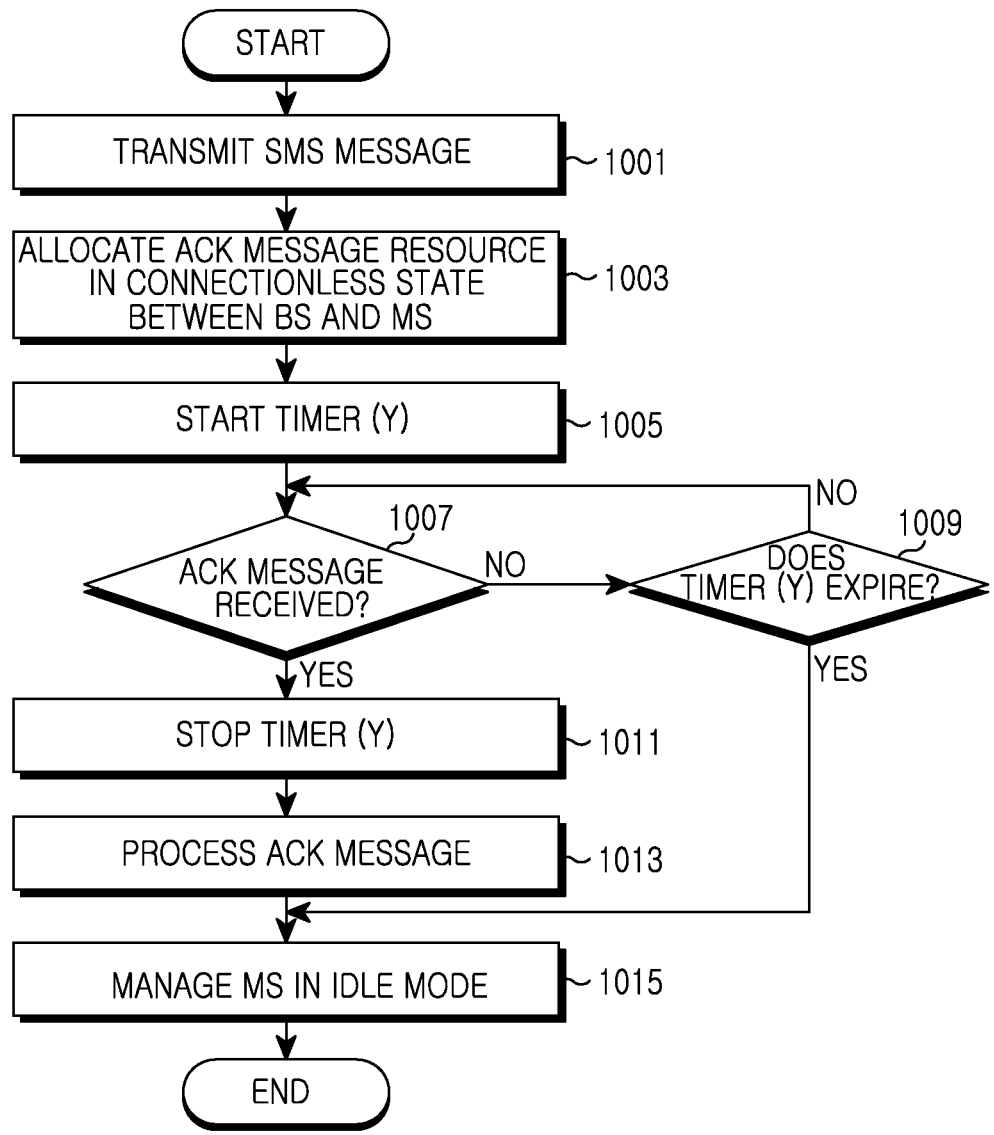
FIG. 10 is a flow diagram illustrating an operation of a BS processing a reception response to an SMS message in a wireless communication system according to an exemplary embodiment of the present invention.

FIG. 10 is a flow diagram illustrating an operation of a BS processing a reception response to an SMS message in a wireless communication system according to an exemplary embodiment of the present invention.

Referring to FIG. 10, in step 1001, the BS transmits an SMS message to an MS through a ranging response message. The ranging response message corresponds to the ranging response message of step 215. At this time, the BS can provide an identifier used for decoding a UL resource for the MS to transmit an ACK message, through the ranging response message. In step 1003, the BS allocates the UL resource used for the MS to transmit the ACK message. In step 1005, the BS starts a timer (Y). In step 1007, the BS identifies if it receives the ACK message from the MS. If receiving the ACK message from the MS, in step 1011, the BS stops the timer (Y). In step 1013, the BS processes the received ACK message. After that, in step 1015, the BS manages the MS in an idle mode. Alternatively, if the result of the determination in step 1007 is that the ACK message is not received from the MS, in step 1009, the BS identifies if the timer (Y) expires. If the timer (Y) expires in a state where the ACK message is not received from the MS, the BS proceeds to step 1015 and manages the MS in the idle mode and, during a next paging listening interval of the MS, the BS again attempts the SMS message transmission of step 1001. In contrast, if the timer (Y) does not expire in the state where the ACK message is not received from the MS, the BS returns to step 1007 and waits for ACK message reception.

In the exemplary embodiment of FIG. 3, a description is made for a case where the idle mode MS intends to transmit the SMS message. In this case, the STID and FID used for the SMS message transmission and ACK message reception are allocated. Here, a way for the idle mode MS to transmit the SMS message and receive the ACK message without allocating the STID and FID is described.

Figure 11:
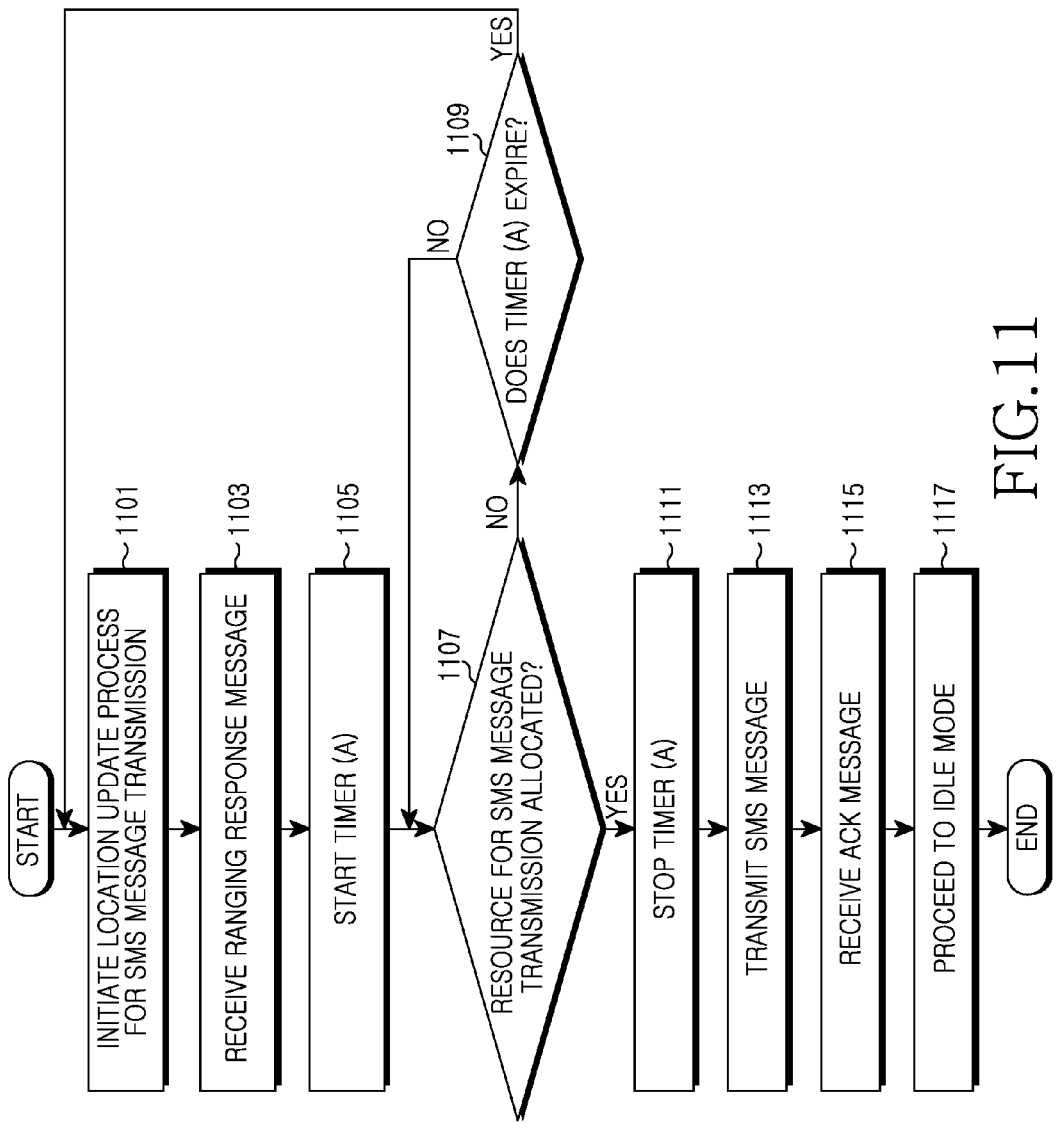
FIG. 11 is a flow diagram illustrating an operation of an MS processing an SMS message in a wireless communication system according to an exemplary embodiment of the present invention.

FIG. 11 is a flow diagram illustrating an operation of an MS processing an SMS message in a wireless communication system according to an exemplary embodiment of the present invention.

Referring to FIG. 11, if an SMS message to be transmitted is generated, in step 1101, an idle mode MS performs a location update process for SMS message transmission as in the case of FIG. 3. In step 1103, the MS receives a ranging response message from a BS. The ranging response message of step 1103 corresponds to the ranging response message received in step 311 of FIG. 3. In step 1105, the MS starts a timer (A) and waits for the BS to allocate a UL resource used for SMS message transmission. In step 1107, the MS determines if the UL resource used for the SMS message transmission is allocated. If the UL resource is allocated, in step 1111, the MS stops the timer (A). Here, an identifier used for decoding the UL resource allocated to the MS can be allocated by the BS through the ranging response message of step 1101. Alternatively, the identifier corresponds to an identifier configured by information capable of identifying the MS such as a paging period of the MS and the like based on an idle mode identifier of the MS. In step 1113, the MS transmits an SMS message using the allocated UL resource. The SMS message transmitted in step 1113 corresponds to the L2 transmission message of step 313 or corresponds to another L2 layer message (e.g., a ranging request message). An FID included in a message header of the SMS message can be either an FID that a BS allocates through the ranging response message in step 1103 or an FID predefined for the SMS message transmission. After that, in step 1115, the MS receives an ACK message about the SMS message from the BS. Then, the MS proceeds to step 1117 and performs an idle mode operation. On the other hand, if the MS is not allocated the UL resource for the SMS message transmission in step 1107 and the timer (A) expires in step 1109, the MS returns to step 1101 and again performs a location update process for SMS message transmission. In contrast, if the timer (A) does not expire in step 1109, the MS returns to step 1107 and waits for UL resource allocation used for the SMS message transmission.

Figure 12:
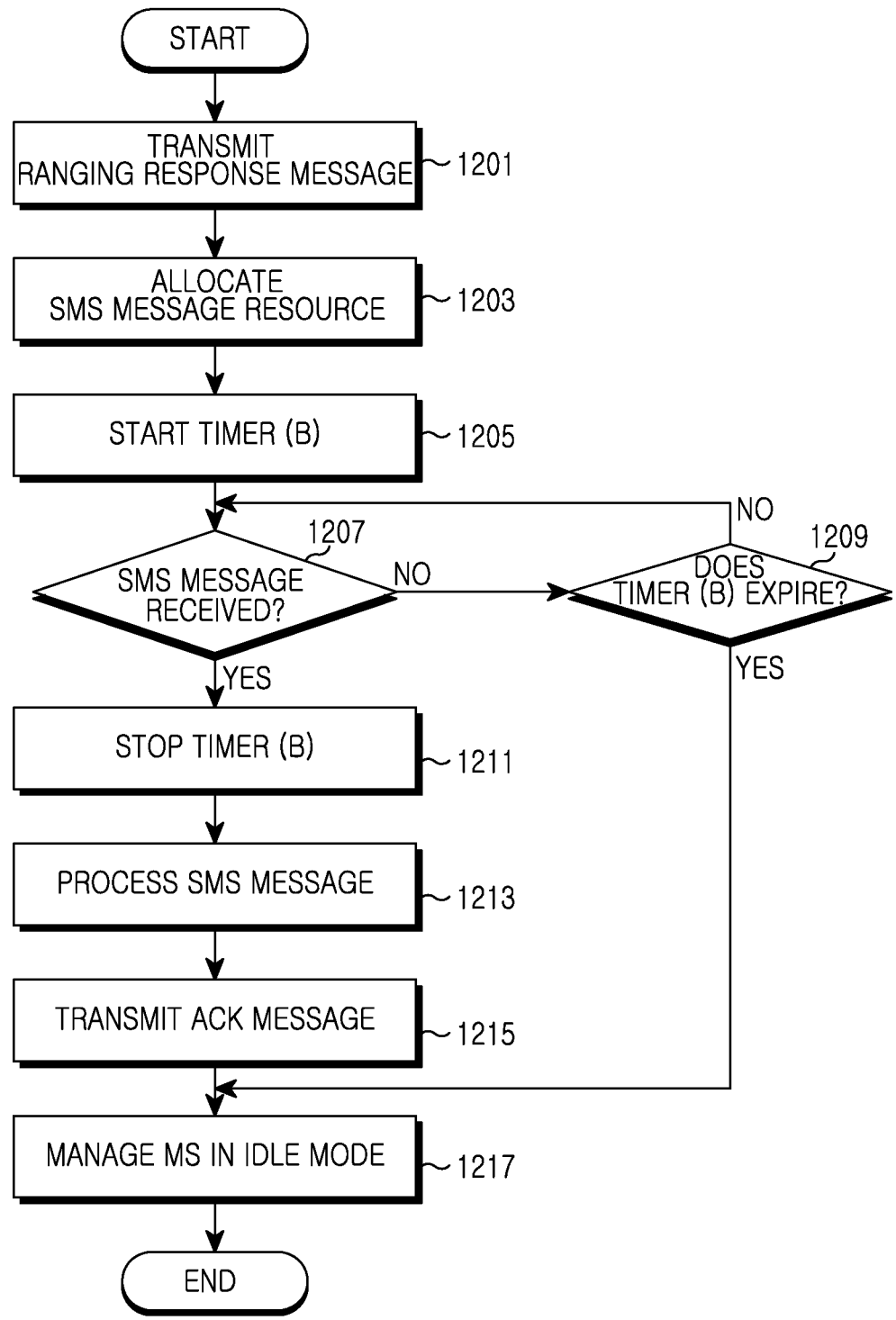
FIG. 12 is a flow diagram illustrating an operation of a BS processing an SMS message in a wireless communication system according to an exemplary embodiment of the present invention.

FIG. 12 is a flow diagram illustrating an operation of a BS processing an SMS message in a wireless communication system according to an exemplary embodiment of the present invention.

Referring to FIG. 12, in step 1201, the BS transmits a ranging response message to an MS performing a location update process for the SMS message transmission. The ranging response message corresponds to the ranging response message of step 311. In step 1203, the BS allocates the MS a UL resource used for transmitting an SMS message. In step 1205, the BS starts a timer (B). The UL resource has to be encoded using an identifier indicating the MS, for representing allocation to the MS. The identifier can be allocated and transmitted by the BS through the ranging response message of step 1201, or can be configured in combination of a paging period of the MS and the like based on an idle mode identifier of the MS. In step 1207, the BS identifies if an SMS message is received from the MS through the UL resource allocated in step 1203. If receiving the SMS message in step 1207, in step 1211, the BS stops the timer (B). In step 1213, the BS processes the SMS message. In step 1215, the BS transmits an ACK message about the SMS message to the MS. Then, the BS proceeds to step 1217 and manages the MS in an idle mode. If the SMS message is not received in step 1207 and the timer (B) expires in step 1209, the BS proceeds to step 1217. In contrast, if the timer (B) does not expire in step 1209, the BS returns to step 1207 and waits for the SMS message reception.

As described above, exemplary embodiments of the present invention have an advantage of being capable of transmitting data without an unnecessary state transition between an idle mode and a connection mode, by providing a way to transmit an SMS message to an idle mode MS and a way to transmit an SMS message from an idle mode MS in a wireless communication system.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of operating a Mobile Station (MS) for supporting a Short Message Service (SMS) in a wireless communication system, the method comprising:

receiving, by the MS, an SMS message from a Base Station (BS) through a ranging response message in an idle mode, the ranging response message being sent from the BS using an identifier;

upon receiving the SMS message from the BS, starting a timer;

while the timer operates, waiting, by the MS, for UpLink (UL) resource allocation for transmission of an ACKnowledge (ACK) message about the SMS message;

decoding and determining, by the MS, a UL resource for the ACK message transmission based on the identifier; and transmitting, by the MS, the ACK message using the UL resource.

2. The method of claim 1, wherein the receiving of the SMS message from the BS through the ranging message in the idle mode comprises:

receiving a location update process request for SMS message reception through a paging message during a paging listening interval, from the BS;

transmitting a ranging code to the BS, and receiving a response to the ranging code;

transmitting a ranging request message to the BS; and receiving a ranging response message including the SMS message, from the BS.

3. The method of claim 2, wherein the ranging request message comprises information indicating that the MS is performing a location update process for SMS communication.

4. The method of claim 2, wherein the ranging response message comprises information indicating a success of a location update process for SMS communication.

5. The method of claim 1, wherein the UL resource comprises a Code Division Multiple Access (CDMA) Allocation A-MAP Information Element (IE).

6. The method of claim 1, wherein a Flow IDentifier (FID) comprised in a Media Access Control (MAC) header of the ACK message is received from the BS through the ranging response message, or is an FID predefined for SMS message reception response.

7. The method of claim 1, further comprising, if the timer expires, transitioning to the idle mode.

8. A method of operating a Base Station (BS) for supporting a Short Message Service (SMS) in a wireless communication system, the method comprising:

transmitting an SMS message through a ranging response message in an idle mode, the ranging response message sent to a Mobile Station (MS) using an identifier;

after transmitting the SMS message, starting a timer; and while the timer operates, encoding and allocating, by the BS, an UpLink (UL) resource for transmission of an ACKnowledge (ACK) message about the SMS message based on the identifier, and receiving, by the BS, the ACK message about the SMS message.

9. The method of claim 8, wherein the transmitting of the SMS message through the ranging message comprises:

transmitting a location update process request for SMS message reception to the MS through a paging message in a paging listening interval;

receiving a ranging code from the MS, and transmitting a response to the ranging code; and receiving a ranging request message from the MS, and transmitting a ranging response message comprising the SMS message to the MS.

10. The method of claim 9, wherein the ranging request message comprises information indicating that the MS is performing a location update process for SMS communication.

11. The method of claim 9, wherein the ranging response message comprises information indicating a success of a location update process for SMS communication.

12. The method of claim 8, wherein the UL resource comprises a Code Division Multiple Access (CDMA) Allocation A-MAP Information Element (IE).

13. The method of claim 8, wherein a Flow IDentifier (FID) comprised in a Media Access Control (MAC) header of the ACK message is received from the BS through the ranging response message, or is an FID predefined for SMS message reception response.

14. The method of claim 8, wherein, when the timer expires, the MS is managed in an idle mode.

15. A Mobile Station (MS) apparatus for supporting a Short Message Service (SMS) in a wireless communication system, the apparatus comprising:

a receiver for receiving an SMS message from a Base Station (BS) through a ranging response message in an idle mode, the ranging response message being sent from the BS using an identifier;

a controller for, upon the MS receiving the SMS message from the BS, starting a timer and, while the timer operates, for waiting UpLink (UL) resource allocation for transmission of an ACKnowledge (ACK) message about the SMS message;

a decoder for decoding a UL resource for the ACK message transmission based on the identifier;

a determiner for determining a the UL resource for the ACK message transmission based on the identifier; and a transmitter for, transmitting the ACK message using the UL resource.

16. The apparatus of claim 15, wherein the receiver receives a location update process request for SMS message reception through a paging message during a paging listening interval from the BS, transmits a ranging code to the BS, receives a response to the ranging code, and receives a ranging response message including the SMS message from the BS, and wherein the transmitter transmits a ranging request message to the BS.

17. The apparatus of claim 16, wherein the ranging request message comprises information indicating that the MS is performing a location update process for SMS communication.

18. The apparatus of claim 16, wherein the ranging response message comprises information indicating a success of a location update process for SMS communication.

19. The apparatus of claim 15, wherein the UL resource comprises a Code Division Multiple Access (CDMA) Allocation A-MAP Information Element (IE).

20. The apparatus of claim 15, wherein a Flow IDentifier (FID) comprised in a Media Access Control (MAC) header of the ACK message is received from the BS through the ranging response message, or is an FID predefined for SMS message reception response.

21. The apparatus of claim 15, wherein, if the timer expires, the controller transitions to the idle mode.

22. A Base Station (BS) apparatus for supporting a Short Message Service (SMS) in a wireless communication system, the apparatus comprising:

a transmitter for transmitting an SMS message through a ranging response message, the ranging response message sent to a Mobile Station (MS) using an identifier;

a controller for, after transmitting the SMS message, starting a timer and, while the timer operates, for encoding an UpLink (UL) resource allocation based on the identifier, and for allocating UL resource for transmission of an ACKnowledge (ACK) message about the SMS message based on the identifier; and a receiver for receiving the ACK message about the SMS message.

23. The apparatus of claim 22, wherein the transmitter transmits a location update process request for SMS message reception to the MS through a paging message in a paging listening interval, transmits a response to a ranging code, and transmits a ranging response message comprising the SMS message to the MS, and wherein the receiver receives the ranging code from the MS, and receives a ranging request message from the MS.

24. The apparatus of claim 23, wherein the ranging request message comprises information indicating that the MS is performing a location update process for SMS communication.

25. The apparatus of claim 23, wherein the ranging response message comprises information indicating a success of a location update process for SMS communication.

26. The apparatus of claim 22, wherein the UL resource comprises a Code Division Multiple Access (CDMA) Allocation A-MAP Information Element (IE).

27. The apparatus of claim 22, wherein a Flow IDentifier (FID) comprised in a Media Access Control (MAC) header of the ACK message is received from the BS through the ranging response message, or is an FID predefined for SMS message reception response.

28. The apparatus of claim 22, wherein, when the timer expires, the controller manages the MS in an idle mode.

29. A Mobile Station (MS) operation method for processing a Short Message Service (SMS) in a wireless communication system, the method comprising:

upon generation of an SMS message to be transmitted in an idle mode, starting a timer, and receiving UpLink (UL) resource allocation used for the SMS message transmission;

transmitting an SMS message using the allocated UL resource; and receiving an ACKnowledge (ACK) message about the SMS message, wherein an identifier used for decoding the UL resource allocated to an MS is allocated through the ranging response message, or is an identifier capable of identifying the MS based on an idle mode identifier of the MS.

30. The method of claim 29, wherein a Flow IDentifier (FID) comprised in a message header of the SMS message is an FID allocated through a ranging response message, or an FID predefined for SMS message transmission.

31. The method of claim 29, wherein, upon a failure of the UL resource allocation for the SMS message transmission, again performing a location update process for the SMS message transmission.

32. A Base Station (BS) operation method for processing a Short Message Service (SMS) in a wireless communication system, the method comprising:

performing UpLink (UL) resource allocation used for SMS message transmission, and starting a timer;

while the timer operates, identifying one of reception and non-reception of an SMS message; and upon receiving the SMS message, transmitting an ACKnowledge (ACK) message about the SMS message, wherein a UL resource is encoded using an identifier indicating the MS, for representing allocation to the MS.

33. The method of claim 32, wherein the identifier can be transmitted through a ranging response message or can be configured in combination of a paging period of the MS based on an idle mode identifier of the MS.

* * * * *